United States Patent [19]

Nagata et al.

[11] Patent Number: 5,077,824
[45] Date of Patent: Dec. 31, 1991

[54] DIRECT-CURRENT MOTOR CONTROL

[75] Inventors: Kunio Nagata, Otokuni; Masatsugu Yamashita, Neyagawa; Shinya Hamazaki, Kameyama, all of Japan

[73] Assignee: Omron Corporation, Kyoto, Japan

[21] Appl. No.: 452,748

[22] Filed: Dec. 21, 1989

[30] Foreign Application Priority Data

Dec. 23, 1988 [JP] Japan .................. 63-326438
May 31, 1989 [JP] Japan .................. 1-140110

[51] Int. Cl.⁵ ........................................ H02P 5/17
[52] U.S. Cl. ........................ 388/819; 388/937; 318/433
[58] Field of Search ........... 318/599, 433, 432; 388/819, 930, 915, 937, 811, 823

[56] References Cited

U.S. PATENT DOCUMENTS

| | | | |
|---|---|---|---|
| 3,564,372 | 2/1971 | Vogelsberg et al. | 318/434 X |
| 3,947,738 | 3/1976 | Oliver | 318/599 X |
| 4,307,326 | 12/1981 | Fukushima et al. | 318/411 |
| 4,458,186 | 7/1984 | Kuriyama et al. | 388/823 X |
| 4,503,370 | 3/1985 | Cuneo | 388/819 |
| 4,719,395 | 1/1988 | Aoi et al. | 318/545 X |
| 4,885,511 | 12/1989 | Millauer et al. | 318/434 |
| 4,949,393 | 8/1990 | Ohmori et al. | 388/815 |

*Primary Examiner*—Bentsu Ro
*Attorney, Agent, or Firm*—Fish & Richardson

[57] ABSTRACT

A motor control circuit for controlling supply of electric power from a power source to an electric motor, in particular for use in electric power tools, comprising: an output power device for controlling supply of current to the motor according to a duty ratio of a control input signal supplied thereto; current detecting means for detecting an amplitude of an electric current supplied to the electric motor; and feedback means for supplying the control input signal to the output power device, the duty ratio of the input control signal being increased with an increase in the electric current supplied to the electric motor as detected by the current detecting means. Since the torque otuput of the motor is increased when such a need arises, the need for more a complex and expensive continually variable speed control system is eliminated.

3 Claims, 2 Drawing Sheets ial to a motor control circuit and, in particular, to a motor control circuit which is suitable for use as a switching circuit for various electric power tools such as powered screw drivers and powered drills which are powered by electric motors.

DIRECT-CURRENT MOTOR CONTROL

TECHNICAL FIELD

The present invention generally relates to a motor control circuit and, in particular, to a motor control circuit which is suitable for use as a switching circuit for various electric power tools such as powered screw drivers and powered drills which are powered by electric motors.

BACKGROUND OF THE INVENTION

Conventionally, a motor control circuit for an electric power tool included a duty ratio control circuit for controlling an output power device which is interposed in a path for supplying electric current to an electric motor to control the torque output of the motor. A variable resistor is included in the control circuit, and the operator can control the rotational speed and the torque output of the motor in a continually variable fashion by adjusting the variable resistor as required.

Such a control circuit offers a high level of convenience to the user, but the need for a variable resistor and a complex control circuit means a high manufacturing cost, and ensuring necessary levels of reliability and durability presents an added difficulty.

To eliminate this problem, it is possible to control the output of the motor in two steps, and reduce the manufacturing cost through the use of a two-position switch mechanism instead of using a variable resistor. However, as the motor can be controlled only in two steps, a satisfactory level of convenience cannot be obtained.

BRIEF SUMMARY OF THE INVENTION

In view of such problems of the prior art, a primary object of the present invention is to provide a motor control circuit which is simple but offers a comparable level of convenience as a continually variable motor control circuit.

A second object of the present invention is to provide a motor control circuit which is suitable for use as a control circuit for an electric power tool and can ensure necessary levels of reliability and durability with an extremely simple structure.

According to the present invention, these and other objects can be accomplished by providing a motor control circuit for controlling supply of electric power from a power source to an electric motor, comprising: an output power device for controlling supply of current to the motor according to a duty ratio of a control input signal supplied thereto; current detecting means for detecting an amplitude of an electric current supplied to the electric motor; and feedback means for supplying the control input signal to the output power device, the duty ratio of the input control signal being increased with an increase in the electric current supplied to the electric motor as detected by the current detecting means.

According to the present invention, since the torque output of the motor is increased as the load on the motor is increased, a control action which is equivalent to a continually variable speed control can be achieved.

According to a preferred embodiment of the present invention, the feedback means comprises: a triangular wave generating circuit connected to an input end of the output power device at its output end and having a first amplifier; a time constant circuit connected to its input end; and a second amplifier connected to an output end of the current detecting means at its input end, and connected to the input end of the first amplifier at its output end so as to define a positive feedback path extending from the current detecting means to the output power device and a duty ratio control path for increasing a time period of each cycle of the triangular oscillation output of the first amplifier with an increase in the electric current supplied to the electric motor as detected by the current detecting means.

In an application which is suitable for use in an electric power tool, the motor control circuit is provided with two control modes for high and low torque output conditions, and the aforementioned control circuit is operated only in the low torque output conditions, so that the user can make use of the full capability of the motor when a full power is required on the one hand and the convenient control action in the reduced capability condition of the motor. Further, in this case, the two step switch over can be carried out in a smooth fashion even when such a switch over is made after the motor has run into a heavy load.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Now an embodiment of the present invention is described in the following with reference to the appended drawings.

Figure 1:
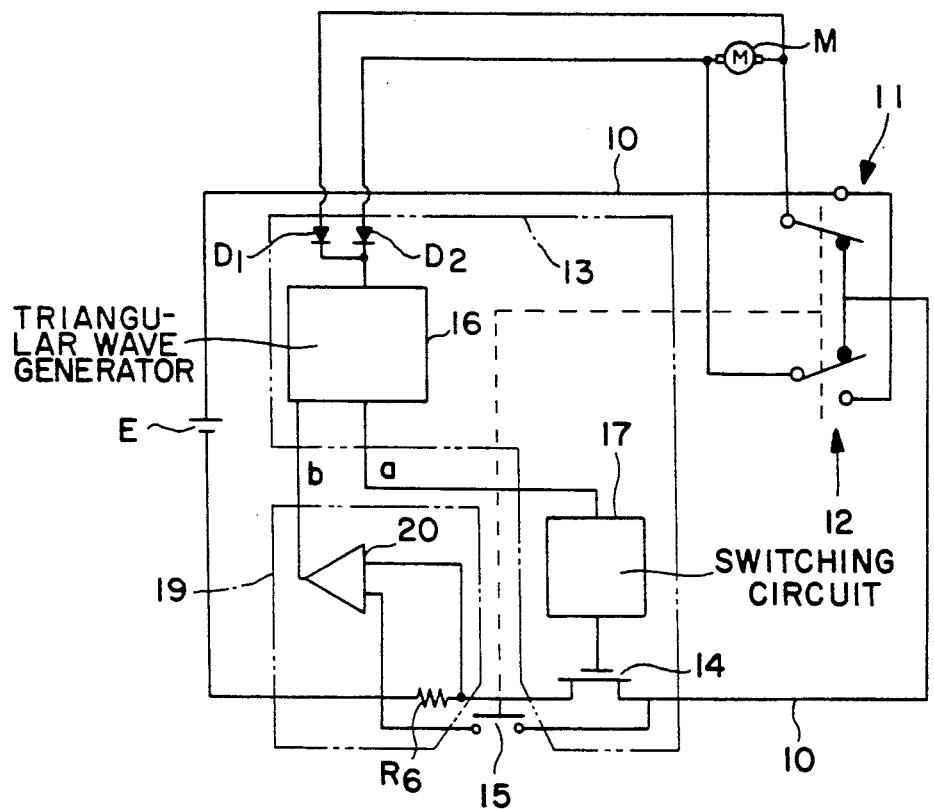
FIG. 1 is a circuit diagram of a preferred embodiment of the motor control circuit for a power tool according to the present invention.

FIG. 1 is a block diagram of the switch circuit of an electric power tool, and, in FIG. 1, a motor M is connected to a power source E by way of a main circuit 10 which comprises a normal rotation control switch unit 11 and a reverse rotation control unit 12 so that power is supplied to the motor M and the motor is driven in a desired direction by turning on one of the switch units 11 and 12.

The main circuit 10 further comprises an output device 14 forming a part of a low speed control circuit 13 and a shorting switch unit 15 forming a high speed control circuit which are connected in parallel with each other, and the torque output of the motor M is controlled by carrying out a switching control on the output device 14 while the shorting switch unit 15 when it is turned on directly connects the motor M to the power source E so as to drive the motor M at high speed.

Figure 3:
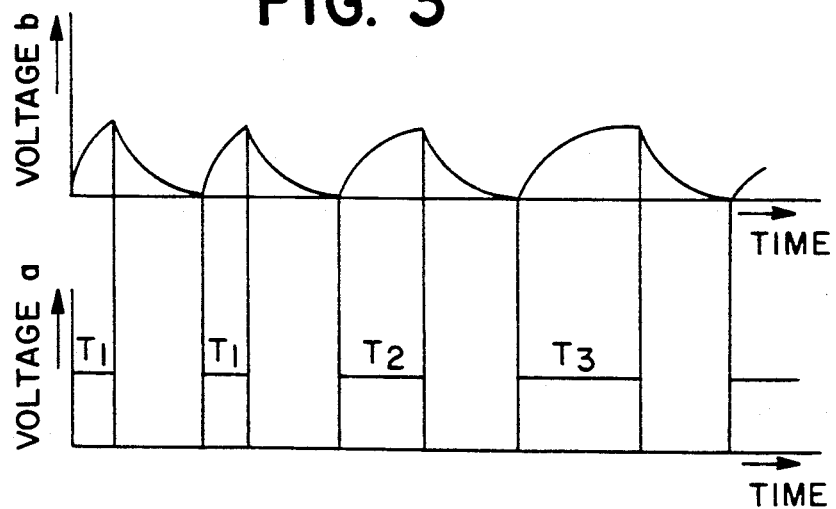
FIG. 3 is a wave form diagram thereof.

The low speed control circuit 13 consists of a triangular wave generating circuit 16, a switching circuit 17, and the aforementioned output device 14. The triangular wave generating circuit 16 is connected to either end of the aforementioned motor M via diodes D1 and D2 which are connected in normal direction, and, as shown in FIG. 2, consists of a resistor R1, a capacitor C1 and a comparator 18 so as to generate a triangular wave (refer to the triangular wave of FIG. 3) having alternating ON intervals and OFF intervals and, at the same time, a control signal "a" is produced during the ON intervals (signal charging intervals) as shown in FIG. 3.

Figure 2:
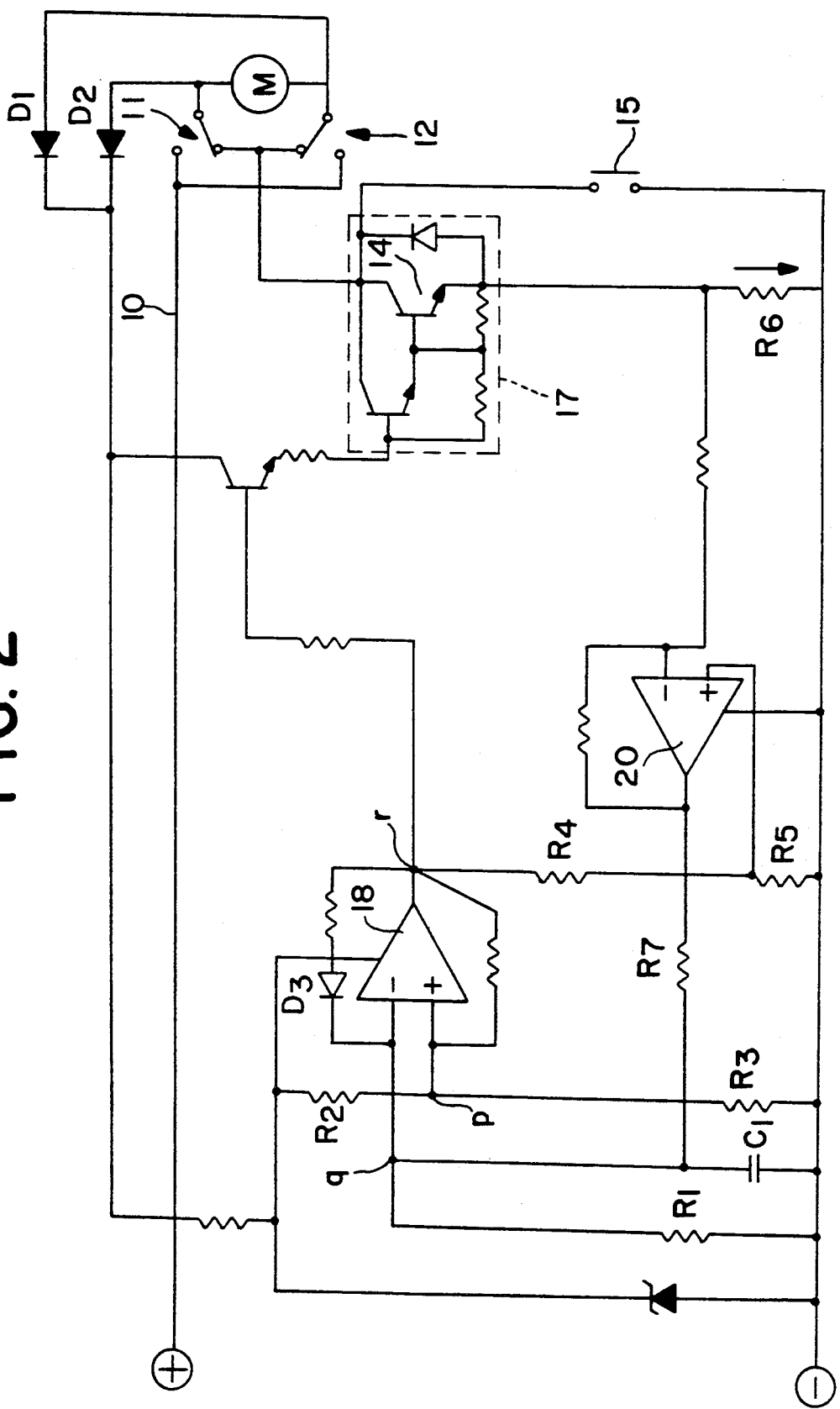
FIG. 2 is a more detailed circuit diagram of the circuit of FIG. 1.

Referring to FIG. 2, a constant voltage divided by resistors R2 and R3 is applied to a non-inverting input of the comparator 18 from a node "p" and a charge/discharge voltage of a charge/discharge circuit consisting of the resistor R1 and the capacitor C1 is supplied to a inverting input of the comparator 18 from a node "q" so as to produce a control signal "a" according to its inputs. In this case, the output from the comparator 18 is supplied to the switching circuit 17 as a control signal "a" so as to carry out a switching control on the output device 14 by a duty ratio corresponding to the oscillation output for drive control of the motor M. Meanwhile, the comparator output is also fed back to the inverting input of the comparator 18 from a node "r" via a diode D3 for charging the capacitor C1 and creating a hysteresis. Likewise, the oscillation output is also supplied to the non-inverting input of an amplifier circuit 20 of a motor current detecting circuit 19, which is described hereinafter, from the node between the resistors R4 and R5.

Between the output device 14 and the power source E is interposed a resistor R6 forming a part of the motor current detecting circuit 19 for detecting the current supplied through the motor M.

The motor current detecting circuit 19 consists of the aforementioned resistor R6 and the amplifier circuit 20 which amplifies the voltage developed across the resistor R6 and produces a detection signal "b" representing the increase and decrease of the current flowing through the resistor R6. The detection signal "b" is fed back to the triangular wave generating circuit 16 in such a manner that the control signal "a" of the triangular wave generating circuit 16 may be increased so as to increase the control current supplied to the motor M in response to the increase in the electric current supplied through the motor M.

The amplifier circuit 20 amplifies a voltage obtained as a difference between the comparator output derived from a node "r" and a voltage derived (which is obtained by converting the motor current into a voltage) from the resistor R6, and, therefore, produces an amplified output (detection signal "b") which is synchronized with the oscillation output of the comparator 18. This amplified output is supplied to a pair of points in the capacitor charge/discharge circuit by way of a resistor R7 to control the charge and discharge of the capacitor C1 by variably controlling the voltage across these points. In other words, in order to control the voltage across the two point, the output of the amplifier circuit 20 is high when the motor current is small and is low when the motor current is large.

The operation of the above described switch circuit for a power tool is now described in the following. Normally, since the shorting switch unit 15 is open, and the low sped control circuit 13 is in an operable state, the motor M is driven at low speed in a desired direction by turning on either the normal rotation control switch unit 11 or the reverse rotation control switch unit 12.

When no load is applied to the motor M, the triangular wave generating circuit 16 produces a basic triangular wave, and the switching circuit 17 is activated by the control signal "a" having ON intervals of time duration T1 so as to drive the motor M via the output device 14 accordingly.

In regards to the comparator 18, its oscillation output is fed back to its inverting input to charge the capacitor C1, and this charge voltage is supplied to the comparator 18 so that the oscillation may be maintained according to the result of a comparison between the charge voltage and a constant voltage of the node "p". The duration T1 of each of the ON intervals of the oscillation output is small when no load is applied to the motor M, and the switching circuit 17 therefore switches over the output device 14 according to a low pulse duty condition.

When a load is applied to the motor M, since the current flowing through the motor M increases, the increased electric current is detected by the motor current detecting circuit 19 consisting of the resistor R6 and the amplifier circuit 20, and accordingly increases the time duration of each of the ON intervals of the triangular wave generated by the triangular wave generating circuit 16 with the result that the time duration T2 or T3 of each of the ON intervals of the control signal "a" is increased to achieve a high pulse duty condition, and the torque output of the motor M is increased.

In other words, the amplifier circuit 20 compares the voltage derived from the resistor R6 and the oscillation voltage from the comparator 18, and controls the voltage across the two points according to the increase in the voltage across the resistor R6, and increases the charge time for the capacitor C1 with the increase in the motor current to change the oscillation time constant of the comparator 18.

Thus, the switching circuit 17 drives the output device 14 with an increased duty ratio in response to the increase in the time duration of the ON intervals. Therefore, when the load of the motor is increased from a state of low speed rotation, the control current of the motor M is automatically increased and its torque output is increased so that a control state equivalent to a continually variable speed control can be obtained.

When a high speed condition is selected, the shorting switch unit 15 is turned on, and the motor M is directly driven by the power source E with the result that a high speed condition is produced. Since such a switch over takes place when the motor torque is high, a shock resulting from the switch over is reduced and a smooth operation is made possible.

Thus, even though the switch circuit is capable of only a speed control of two steps, high and low, a rotation control equivalent to a continuously variable control can be accomplished and a high level of convenience can be achieved by using simple and economical circuit structure.

Therefore, when this invention is applied to a motor speed control of two steps, high and low, a speed control equivalent to a continually variable speed control is obtained, and both convenience and cost reduction through simplification of the circuit structure can be achieved at the same time.

What we claim is:

1. A direct-current motor control circuit for controlling supply of electric power from a power source to an electric motor, comprising:
    an output power device for controlling supply of current to said motor according to a duty ratio of a control input signal supplied thereto;
    current detecting means for detecting an amplitude of an electric current supplied to said electric motor; and feedback means comprising a triangular wave generating circuit connected to an input end of said output power device at its output end and having a first amplifier;
a time constant circuit connected to the input end of said first amplifier; and
a second amplifier connected to an output end of said current detecting means at its input end, and connected to said input end of said first amplifier at its output end so as to define a positive feedback path extending from said current detecting means to said output power device and a duty ratio control path for increasing a time period of each cycle of said triangular wave generating circuit of said feedback means with an increase in said electric current supplied to said electric motor as detected by said current detecting means.

2. A motor control circuit according to claim 1, wherein said current detecting means comprises a resistor connected in a path for supplying electric current to said electric motor.

3. A direct-current motor control circuit according to claim 1, wherein said direct-current motor control circuit is used in an electric power tool.

* * * * *